US 6,636,510 B1

(12) United States Patent
Lee et al.

(10) Patent No.: US 6,636,510 B1
(45) Date of Patent: Oct. 21, 2003

(54) MULTICAST METHODOLOGY AND APPARATUS FOR BACKPRESSURE-BASED SWITCHING FABRIC

(75) Inventors: Denny Lee, Kanata (CA); Charles Mitchell, Nepean (CA); Natalie Giroux, Ottawa (CA); Tom Davis, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/320,628

(22) Filed: May 27, 1999

(30) Foreign Application Priority Data

May 28, 1998 (CA) .............................................. 2239133

(51) Int. Cl.[7] .............................................. H04L 12/56
(52) U.S. Cl. ..................................... 370/390; 370/414
(58) Field of Search ................................ 370/236, 390, 370/416, 414; 709/207

(56) References Cited

U.S. PATENT DOCUMENTS

| 5,535,197 | A | * | 7/1996 | Cotton | 370/395.72 |
| 5,787,084 | A | * | 7/1998 | Hoang et al. | 370/390 |
| 5,875,189 | A | * | 2/1999 | Brownhill et al. | 370/395.7 |
| 5,991,298 | A | * | 11/1999 | Hunt et al. | 370/390 |
| 6,018,771 | A | * | 1/2000 | Hayden | 709/231 |
| 6,201,792 | B1 | * | 3/2001 | Lahat | 370/236 |
| 6,212,582 | B1 | * | 4/2001 | Chong et al. | 370/414 |
| 6,310,879 | B2 | * | 10/2001 | Zhou et al. | 370/397 |
| 6,349,097 | B1 | * | 2/2002 | Smith | 370/390 |
| 6,442,172 | B1 | * | 8/2002 | Wallner | 370/416 |

FOREIGN PATENT DOCUMENTS

WO    WO95/30318    11/1995

OTHER PUBLICATIONS

Choudry, A.K. and E.L. Hahne, Dynamic queue length thresholds in a shared memory ATM switch. 1996. 679–687.

Chiussi, F.M., Y. Xia and V.P. Kumar. Backpressure in shared –memory–based ATM switches under multiplexed bursty sources. 1996. 830–843.

* cited by examiner

Primary Examiner—Hassan Kizou
Assistant Examiner—Dmitry Levitan

(57) ABSTRACT

In an N×N packet switch, for example an ATM switch, multicast connections receive backpressure signals from congested output ports in the switch core. The cells in the connections are destination address modified not to send to the congested output port, but to continue sending to the other output ports in the connection. The multicast cells may include a user selected primary route identification and be queued in a unicast input queue for the primary route before being destination address modified. Destination address modification for congestion may be accompanied by partial packet discard, through destination address modification of the remaining cells forming part of a multiple cell packet to remove the destination address for the congested port (whether or not it is now congested) where one of the multiple destination addresses of one of the cells in the packet has been modified to remove the destination address of the congested output port. Destination address modification for congestion, without or without partial packet discard, may be accompanied by hybrid head of line blocking performed by not sending from a multicast queue if an output port on one of the multicast leafs is congested and the input queue size is below a given threshold, and sending with destination address modification and optional partial packet discard if the queue size is above the threshold.

12 Claims, 8 Drawing Sheets

| |
|---|
| Cell type = Internal RM cell |
| Source address : Address of originating device |
| Destination address : Address of destination device |
| Congestion Indicator (Back pressure) : ON |
| ............... Additional Fields ............... |
FIG. 11
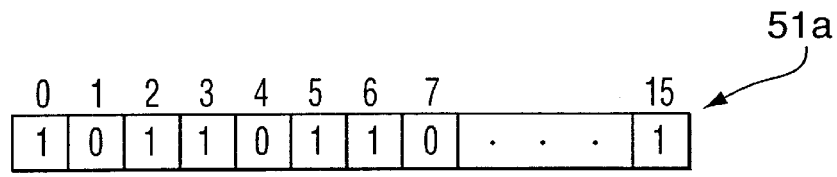
FIG. 12
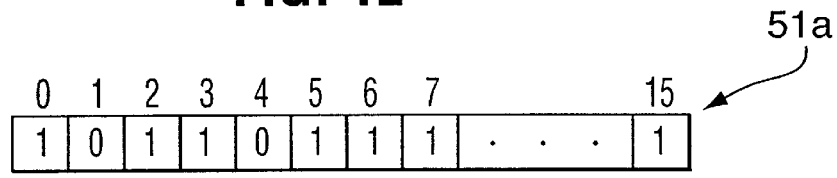
FIG. 13
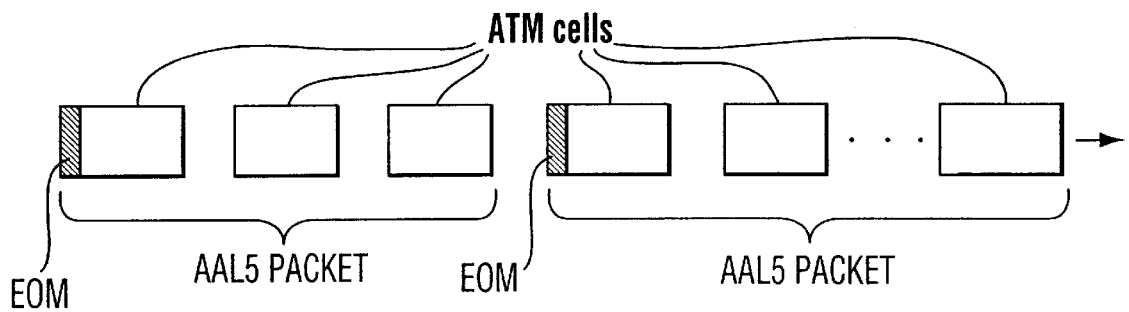
FIG. 14
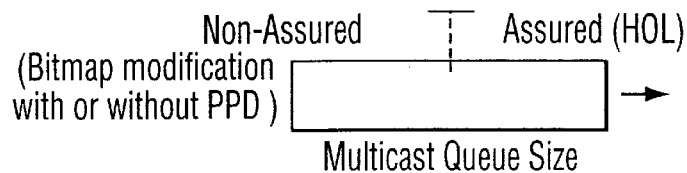
FIG. 15

MULTICAST METHODOLOGY AND APPARATUS FOR BACKPRESSURE-BASED SWITCHING FABRIC

The invention relates generally to the art of packet-switching systems and more specifically to a method and apparatus for implementing backpressure in a packet-switched network, such as an ATM network.

There is an evolutionary trend in the design of large capacity switching systems to move complexity away from the switching fabric, or core, towards the periphery of such systems. The periphery typically includes interfaces for physical links over which cells, or packets, of data are carried to and from the switch, and functionality for adapting and conforming the data to the requirements of particular communications network technology, such as ATM.

The switch fabric may be implemented as a conventional cell space switch whereby cells are received at any of N input ports and switched to any of N output ports. The design of such fabrics are rather simple, and typically include buffering at each output port. Buffering within the fabric may not be adequate, depending on demands from periphery subsystems, resulting in loss of data cells at the fabric.

Backpressure is a well known feedback technique to reduce or prevent cell loss when the switch fabric experiences congestion. The fabric sends a backpressure indication (feedback message) for a congested output port to the peripheral subsystem, which in response holds back sending cells destined to that port. Conventional backpressure works well with point-to-point cell traffic, but does not work well with point-to-multipoint traffic, see for example Backpressure in Shared-Memory-Based ATM Switches under Multiplexed Bursty Sources by Fabio M. Chiussi et al, 0743-166X/96 IEEE.

ATM has fast been accepted as the new generation of transport mechanism for carrying multiple medium data which require different Quality of Service (QoS). As such, traffic sources with real time and non-real time requirements can be transported using the same telecommunication infrastructure. One QoS guarantee by ATM is related to the amount of transient delay through a node. Of particular interest is the non-real time traffic type which typically can tolerate only very low cell loss rate but has no stringent delay requirements. For example, e-mail, Internet access and file transfer applications would fall under this category. It is envisaged that such applications would be highly popular and will be one of the key driving forces behind the development of ATM.

For an ATM switch to provide multiple QoS to the various traffic types (commonly referred to as service categories in the context of ATM Traffic Management Specification Version 40., at trade-mark-0056.00 April 1996 available at http://www.atinform.com/atinform/specs), it must provide advance traffic management features such that the different QoS guarantees are met. To accommodate non-real time traffic sources, which are typically mapped into nrt-VBR (non real time Variable Bit Rate), ABR (Available Bit Rate) or UBR (Unspecified Bit Rate) service category, sufficiently large buffers in the switch are required to guarantee the low cell loss ratio requirement. This is especially true in the case of very bursty non-real time traffic.

Combining the above requirements to provide advanced traffic management features with large buffers for low cell loss rate and the requirements for a highly scaleable ATM switch, it is evident that the concept of "backpressure" is very attractive in achieving these goals. For example, in a typical N×N switching architecture, the use of backpressure would allow congestion in the switching fabric to "pushback" to the input buffer. When designed properly, one can achieve lossless-ness through the switching fabric. This push-back action allows queuing to be done at each input queue in the peripheral subsystem. The peripherical subsystem is typically of lower speed and it allows for ease of implementation with respect to these advanced traffic management features that provide nodal QoS guarantee. Obviously, the concept of back-pressure is only applicable to non real time traffic types as it is a means to allow for a larger buffer. These larger buffers decrease the probability of cell loss but inevitably increase cell transfer delay through the switch and are therefore not suitable for real-time traffic.

The use of backpressure also means that at the input queuing point, unicast, or point-to-point, connections (i.e. connections that are destined to one and only one output port) must be queued in a per-output manner (i.e. separate queues for each output port at each input queuing point). This is to alleviate the problem of Head-of-Line (HOL) blocking in which the cell at the head of the queue is destined to an output port that is in backpressure mode and hence "blocking" all the cells that are queued up behind it. By queuing at each input queuing point using a per-output-port queue model, each of these queues can react to the corresponding backpressure indication and be stopped (i.e. backpressure without HOL blocking) accordingly.

However, multicast operation (i.e.: connections that are sourced at a single point and are destined to more than one output port, a single source to many destinations model) within a backpressure switch is problematic. It is problematic in that each multicast connection is being "copied" (i.e.: multicast typically occurs in the switching fabric) by the N×N fabric and each destination output port queue can be in a different state of backpressure. One must therefore determine how to queue up this multicast traffic at the input peripheral subsystem (input queuing point) and how to serve these cells while still maintaining the cell lossless-ness through the switching fabric.

One existing solution is not to provide cell lossless-ness through the switching fabric. Backpressure is not used with non-real time multicast traffic. However, low cell loss rate often requires much larger buffers dedicated to multicast traffic at the switching fabric. This is very costly and inefficient.

An alternative existing solution is to queue all multicast connections together at the input queuing point in a single queue and ignore the backpressure indication. (i.e., Fire-at-will). This will jeopardize the lossless-ness features of backpressure. This also has serious fairness problems as the multicast connection takes advantage of the unicast connections as they properly react to the backpressure indication.

A further alternative is HOL blocking. All multicast connections are queued together at the input queuing point in a single queue. Instead of ignoring the backpressure indication, the queue only sends a multicast cell from this queue when there is no backpressure indication at all from all switch output port queues.

A slight improvement, that still does not totally eliminate HOL blocking, is to examine the destinations of the cell at the head of the input queuing point. When all these destinations are not in backpressure, then the cell is transmitted. Meanwhile, there could be cells that follow into the input queuing point which are designated to non-backpressured switch output queues and hence HOL blocking still results from this situation. When the blocking situation is severe enough, the queue eventually overflows and cells are lost.

Broadly speaking, the invention provides methods and apparatuses for applying backpressure in a packet-switch, such as an ATM network.

In a first aspect the invention provides a method of relieving congestion in a packet switch. The method sends cells to output ports of a switch core in accordance with a destination address specified for each cell. It monitors for congestion at each output port, and when congestion is detected at an output port and cells are received at an input port of the switch destined for multiple destination addresses including the congested output port, modifies the multiple destination addresses to remove the destination address of the congested output port. The method continues to send the modified cell to the multiple destination addresses other than the congested output port.

The method may further employ the step of, prior to receiving cells at input ports of the switch that are destined for multiple destination addresses, identifying a primary route at the option of a user for such cells and if the congested output port is on the primary route then not modifying the multiple destination addresses for the cells to remove the destination address of the congested output port.

For all cells: (i) received at the input port; (ii) destined for multiple destination addresses including the congested output port; and (iii) forming part of a multiple cell packet where one of the multiple destination addresses of one of the cells in the packet has been modified to remove the destination address of the congested port; the method may further discard those remaining cells in the packet received at the input port and destined for the congested output port whether or not the congested output port continues to be congested, until receiving the cell containing an end of packet boundary.

The method may further not modify the multiple destination addresses as described previously if less than a given number of cells have been queued at the input port and not already sent from the input port to the switch core. This step is not combined with identification of primary route as described above.

This step may be optionally combined with partial packet discard as described above.

In a further aspect the invention provides apparatuses with means for carrying out all elements of the methods described above.

For a better understanding of the present invention, and to show more clearly how it may be carried into effect, reference will now be made, by way of example, to the accompanying drawings, which show a preferred embodiment of the present invention, and in which:

FIG. 11 is a sample format of the cell of FIG. 10;

FIG. 12 is a bitmap containing sample destination addresses for a multicast cell;

FIG. 13 is the bitmap of FIG. 12 modified to remove the destination address of a destination connected through a congested output port of a switch core;

FIG. 14 is a diagram illustrating the relationship between an AAL5 packet and ATM cells;

FIG. 15 is a diagram of a threshold for modification and transmission of multicast cells from an input queue in a hub card of the switch of FIG. 2;

As used in this specification, the term "packet" refers to any fixed or variable length message or package of information. In the preferred embodiment, the packet comprises a fixed length ATM or ATM-like cell, except where specific reference is made to another type of packet.

GENERAL SWITCH ARCHITECTURE

The preferred embodiment is discussed in relation to a model 36170 Mainstreet Xpress™ ATM packet switch manufactured by Newbridge Networks Corporation of Kanata, Ontario. The basic architecture of this switch is disclosed in PCT Publication No. WO95/30318 (corresponding to PCT Application No. PCT/CA95/00248) published on Nov. 9, 1995 and owned by the assignee of the present application, which disclosure is incorporated herein by reference in its entirety.

Figure 1:
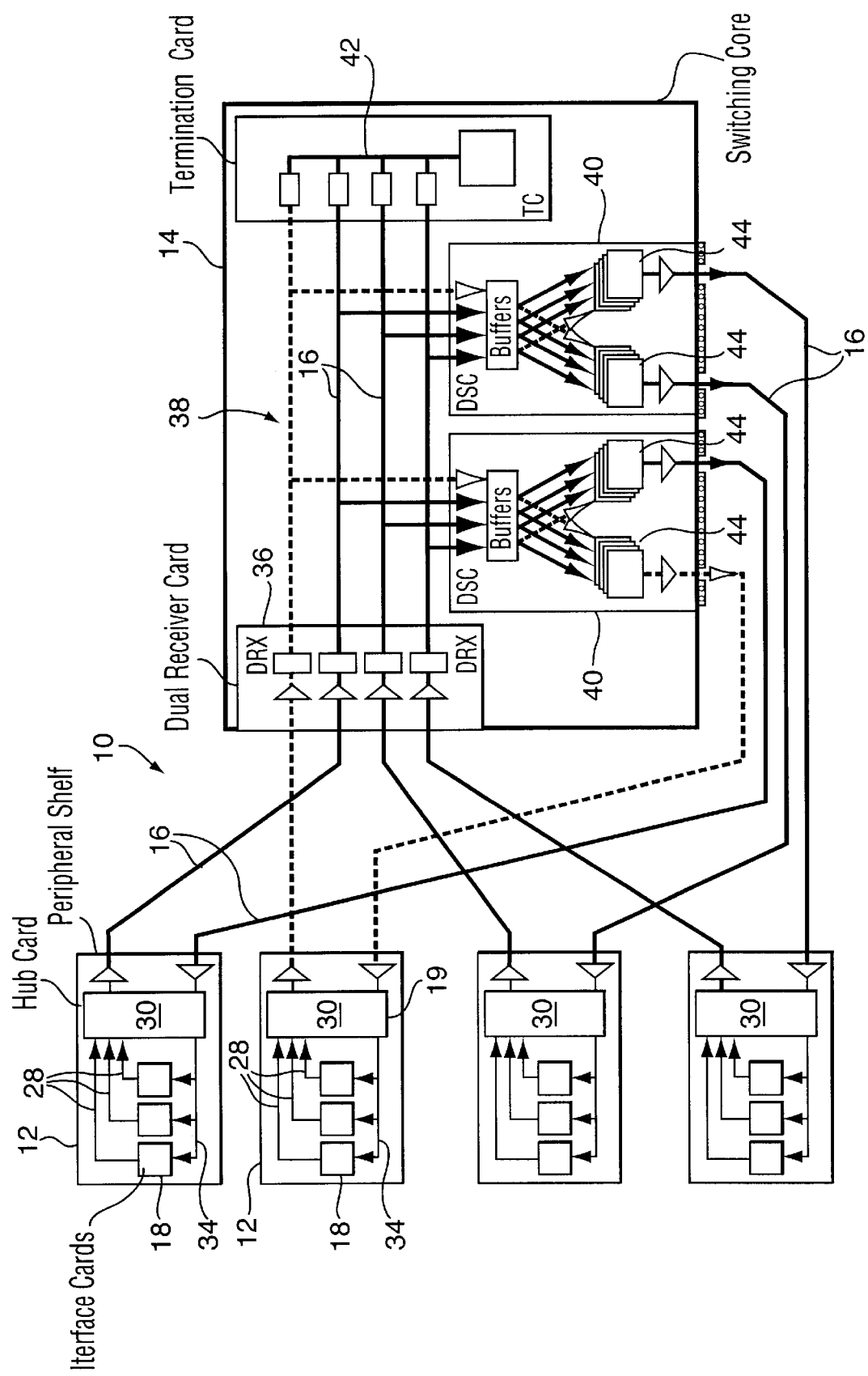
FIG. 1 is a block diagram illustrating the architecture of a preferred packet switch, including interface cards thereof according to a preferred embodiment of the invention.

FIG. 1 illustrates at a high level the architecture of the preferred 36170 ATM packet switch 10. The switch 10 comprises at least one peripheral access shelf 12 which features a plurality of universal card slots (UCS) for housing a variety of interface cards 18 or system cards 19. In the illustrated embodiment, four peripheral shelves 12 are shown, with each shelf housing three interface cards 18. The peripheral shelves 12 are connected to a switching fabric or core 14 (which resides on a separate shelf) via a plurality of high speed fibre optic buses 16 termed Intershelf Links (hereinafter "ISL bus 16").

Figure 2:
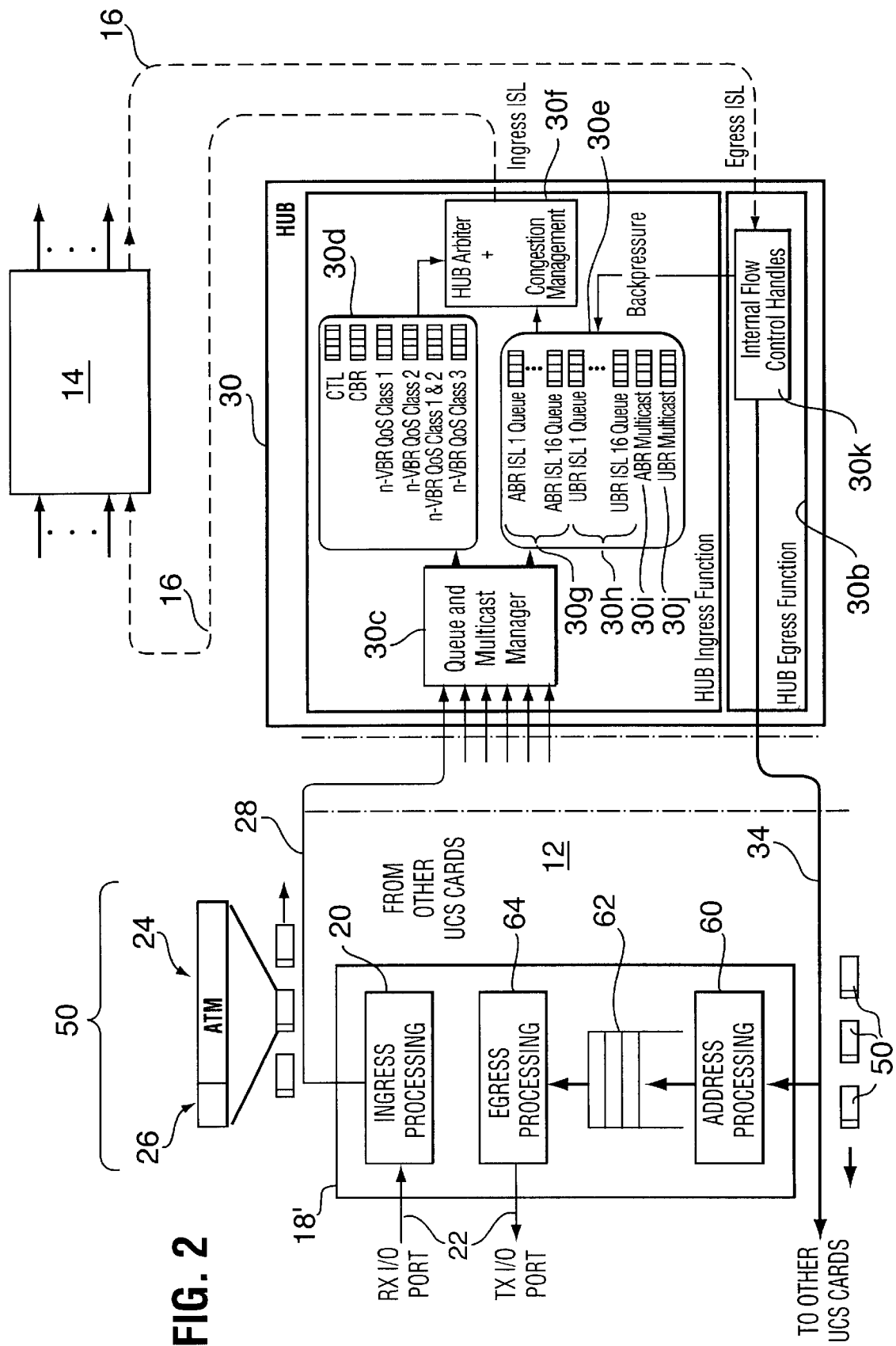
FIG. 2 is a block diagram illustrating in greater detail the structure of a preferred interface card and hub card queues employed in the packet switch of FIG. 1.

Referring to FIGS. 1 and 2, on each peripheral shelf 12, the interface cards 18 thereof are connected in a star topology for the transfer of data towards the switching core 14. A hub card 30 (which is one type of system card) multiplexes a plurality of "Add" buses 28 from the various interface cards 18 on shelf 12 to an uplink portion of the high speed ISL bus 16. The hub card 30, which performs a hub ingress function and a hub egress function, also terminates a downlink portion of the ISL bust 6 from the switching core 14 and drives a multi-drop bus 34, which feeds interface cards 18.

The hub ingress block 30a has a queue and multicast manager 30c, non-backpressure queue blocks 30d, backpressure queue blocks 30e, and hub arbiter and congestion management system 30f. The queue blocks 30e include separate ABR queues 30g and UBR queues 30h including one ABR queue and one UBR queue for each possible output port for which the switch core 14 (as described below with reference to queue 40a, there are 16 possible output ports in the 36170 therefore there are 16 queues in each of queues 30g, 30h) and separate multicast ABR queue 30i and multicast UBR queue 30j. In the preferred embodiment, backpressure is not applied to the nrt-VBR although it could be applied as nrt-VBR is a non real-time service. Backpressure is applied to the ABR queues 30g and UBR queues 30h. Backpressure is a form of feedback from the switch core 14 indicating congestion as will be described further below.

The queue and multicast manager 30c directs cells to the appropriate queues within the queue blocks 30d, 30e. The hub arbiter and congestion management system 30f determines which queue in any queue block 30d, 30e will have access to the ingress ISL (uplink ISL bus) 16 at any particular point in time.

The hub 30 has an internal flow control handler 30k for performing the hub egress function.

Figure 7:
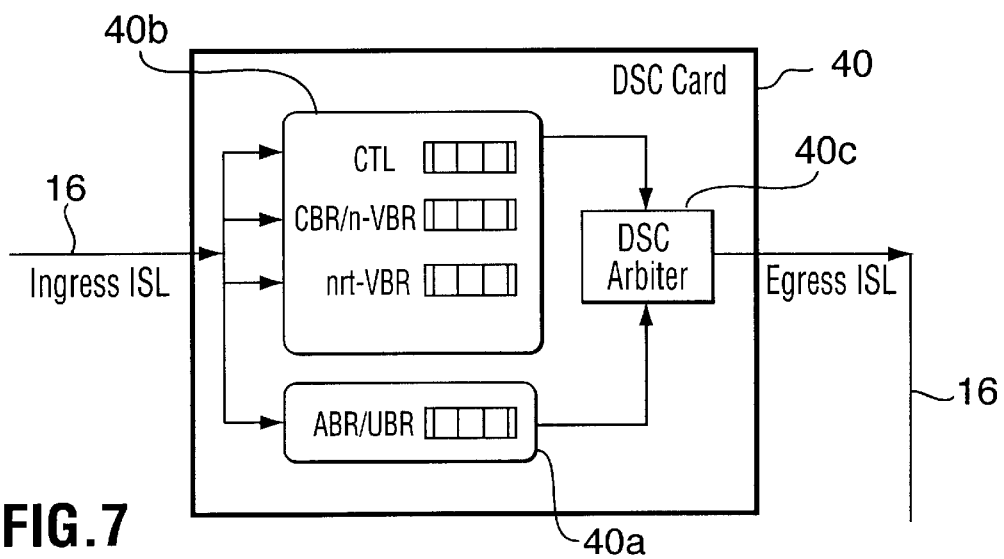
FIG. 7 is a block diagram of a dual switching card (DSC) half showing queues and a DCS arbiter used in the switch of FIG. 1.

Referring to FIG. 7, the switch core 14 has a series of queues (the queues reside in and share buffers 44 of FIG. 1) for each half of a DSC 40, one queue 40a shared by the, backpressure services (ABR/UBR), and separate queues 40b for each of the other services. In the 36170, a switch 10 can have a maximum of 16 DSC 40 halves, each half capable of making one connection at a time. Therefore, there are up to 16 queues 40a, one for each DSC half 40. Again, this is purely a design limitation and it will be evident to those skilled in the art that other configurations are possible.

The queues 40a, 40b feed a DSC arbiter 40c which determines at any point in time which of queues 40a, 40b has access to the down link (egress) ISL 16. The switch fabric (bus 38 described below) has been omitted in FIG. 7 for simplicity.

Figure 8:
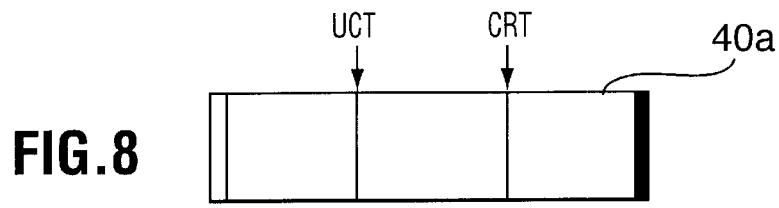
FIG. 8 is a diagram of queue thresholds for an ABR/UBR queue of FIG. 7.
Figure 9:
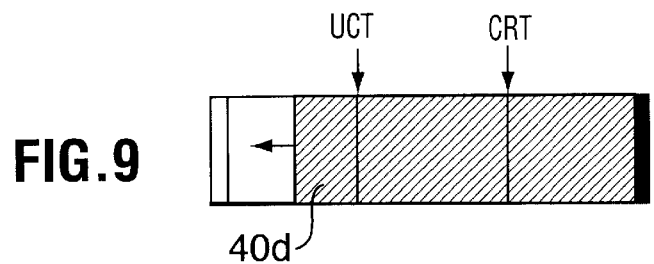
FIG. 9 is a diagram of the queue of FIG. 8 showing the queue exceeding one of its thresholds.
Figure 10:
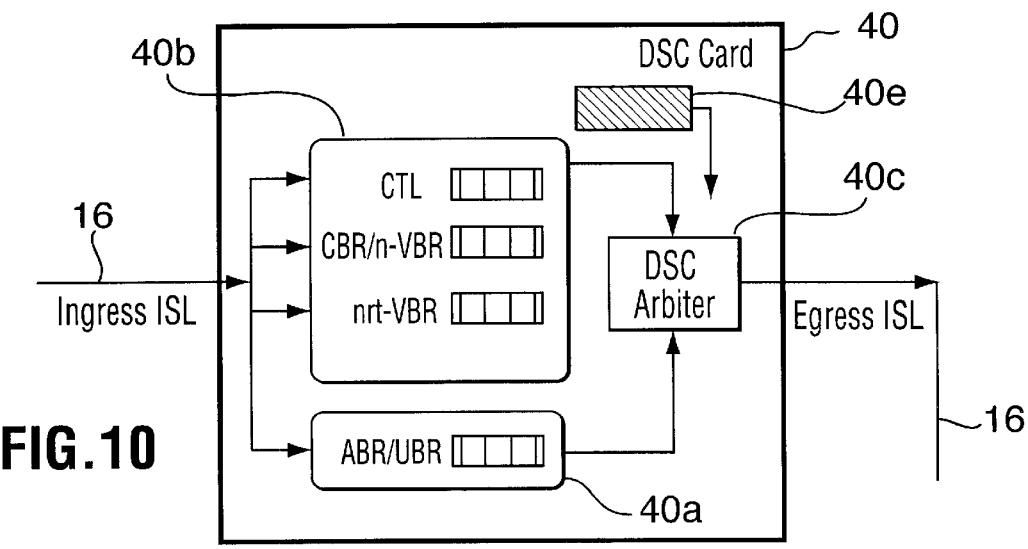
FIG. 10 is a the block diagram of FIG. 7 with an internal resource management cell emitting from a CTL queue.

Referring to FIG. 8, there are two thresholds at the ABR/UBR queue 40a: the Upper Congestion Threshold (UCT) and the Congestion Relief Threshold (CRT). Referring to FIGS. 9 and 10, when the ABR/UBR queue size 40d crosses UCT upwards, a backpressure message is sent in an Internal Resource Management (IRM) cell 40e from the highest priority control queue CTL of queues 40b to the hub arbiter and congestion management system 30f through the internal flow handler 30k.

A sample format for the cell 40e is shown in FIG. 11. FIG. 11 only lists the cell fields specific to this description. The source address refers to the address of the output queue 40a that generated the IRM cell 40e. The destination address refers to the address of the hub arbiter and congestion management system 30f of the hub card 30 connected to the egress ISL 16 for the congested queue 40a.

The system 30f maintains a queue backpressure bitmap, not shown, for the backpressure state of each queue 30g, 30h. The queue backpressure bitmap is updated on receipt of backpressure messages from the switch core 14 for the individual queue of queues 30g, 30h that correspond to the congested output queue 40a.

When the ABR/UBR queue 40a depth falls below CRT, a backpressure off message is sent (for example in an IRM cell having the format of FIG. 11 with the Congestion Indicator "OFF") to the system 30f to resume transmission of cells from the affected queue of queues 30g, 30h.

The IRM cells 40e are carried in the highest priority Control (CTL) queue of queues 40b. Therefore, the probability of loss of these cells is virtually nil. Nevertheless, timers may be implemented to account for a loss of either type of IRM cell (Congestion Indicator ON/Congestion Indicator OFF) to assure a high level of robustness for the IFC handler 30k.

Figure 16:
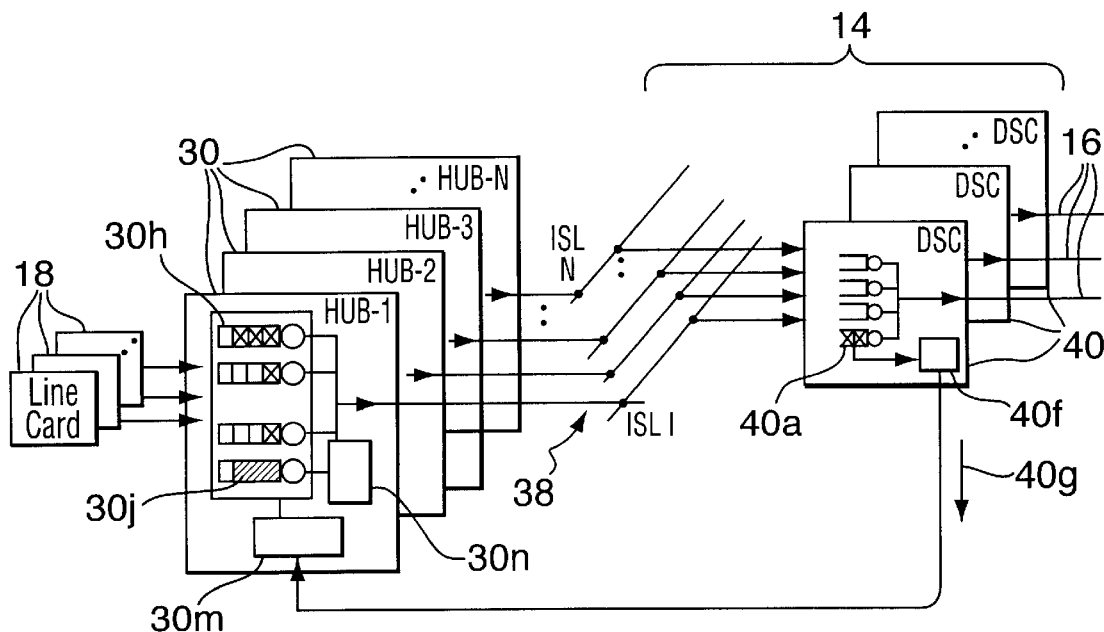
FIG. 16 is a diagram of the switch of FIG. 1 in greater detail illustrating the relationship between the hub cards, switch fabric, and switch core queues for address modification modification and optional partial packet discard.
Figure 17:
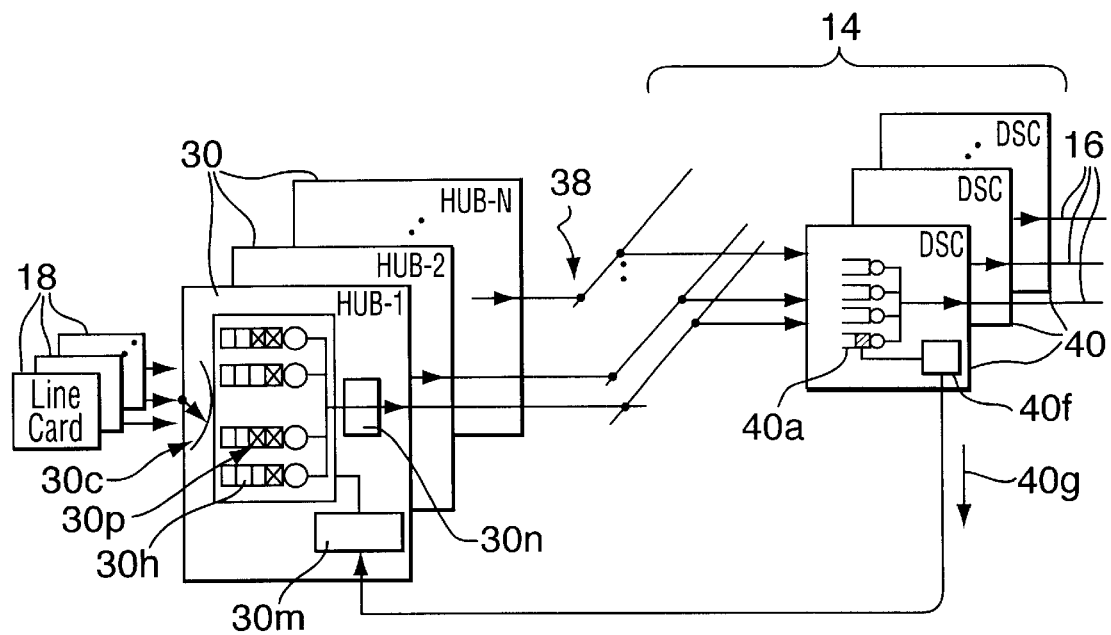
FIG. 17 is a diagram of the switch of FIG. 1 in a form similar to FIG. 16, but configured for primary route with destination address modification modification.
Figure 18:
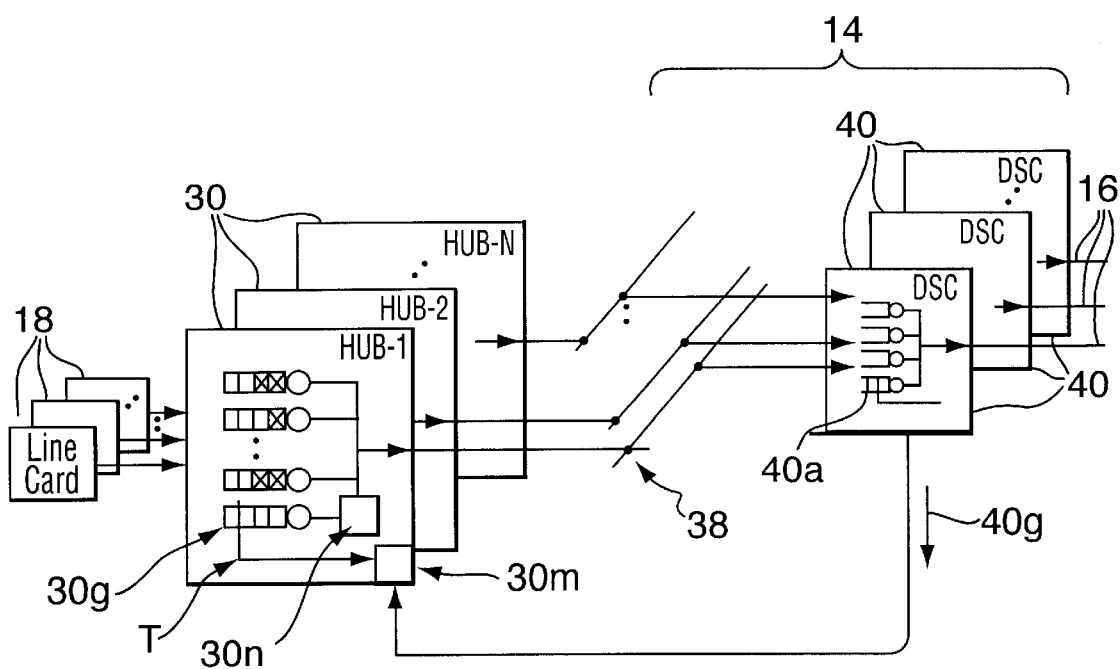
FIG. 18 is a diagram of the switch of FIG. 1 in a form similar to FIGS. 16 and 17, but configured for hybrid head of line blocking with address modification modification and optional partial packet discard.

Referring to FIGS. 16, 17 and 18, the backpressure method is simplified to show a non real-time queue (in this case ABR/UBR as discussed elsewhere) congestion detection unit 40f which generally provides the backpressure functions of the switch core 14 described above, namely identification of congestion in the non real-time queue (currently ABR/UBR) 40a, and forwarding of a backpressure indication (as indicated by arrow 40g). Similarly, a queue arbitration unit 30m generically provides the backpressure functions of the hub card 30 described above, namely receipt of the backpressure indication 40g and control of which queue 30g, 30h, 30i, 30j to serve in accordance with received backpressure indication 40g. The backpressure indication 40g is shown generically as a direct access between the units 30m and 40f. This can be replaced by the IRM cell 40e method of access through the downline ISL's, the handler 30k and the arbiter unit 30f discussed previously.

Referring again to FIG. 1, the switching core 14 comprises at least one dual receiver card (DRX) 36 (one DRX is shown) which formats incoming data from the uplink portion of ISL bus 16 into a form suitable for transmission onto a parallel backplane bus 38. A termination card (TC) 42 provides electrical termination for the backplane bus 38. At least one dual switching card (DSC) 40, as explained in greater detail below, is to examine the backplane bus 38 to determine whether any packets, e.g. ATM cells, are intended for the peripheral shelves 12 serviced to particular DSC 40 and, if so, to copy the cell of the bus 38 and into one of a plurality of down ISL queues 44 for subsequent transmission of the cell over the proper downlink portion of the ISL bus 16 to the correct peripheral shelf 12. In this manner, any interface or system card can communicate with other interface or system card.

Referring again to FIG. 1, the switching core 14 comprises at least one dual receiver card (DRX) 36 (one DRX is shown) which formats incoming data from the uplink portion of ISL bus 16 into a form suitable for transmission onto a parallel backplane bus 38. A termination card (TC) 42 provides electrical termination for the backplane bus 38. At least one dual switching card (DSC) 40 (two DSCs are shown) is connected to the backplane bus 38. The function of each DSC 40, as explained in greater detail below, is to examine the backplane bus 38 to determine whether any packets, e.g. ATM cells, are intended for the peripheral shelves 12 serviced by the particular DSC 40 and, if so, to copy the cell off bus 38 and into one of a plurality of down ISL queues (DS) 44 for subsequent transmission of the cell over the proper downlink portion of the ISL bus 16 to the correct peripheral shelf 12. In this manner, any interface or system card can communicate with any other interface or system card.

Referring additionally to FIG. 2, one example of interface card 18 is an ATM cell relay card 18' which transmits and receives ATM cells over a port 22 between an external ATM aggregate source and the switching core 14. Interface card 18' comprises an ingress processing means 20 for converting incoming ATM cells 24 from the input side of port 22 into ATM-like cells termed Newbridge ATM (NATM) cells 50. This is accomplished by examining the VPI/VCI field of incoming ATM cell 24 and, based on this field, attaching a proprietary tag or header 26 to the ATM cell which is used to identify an internal address for routing the ATM cell. The NATM cell 50 is routed toward the switching core 14 over local Add bus 28.

Figure 3:
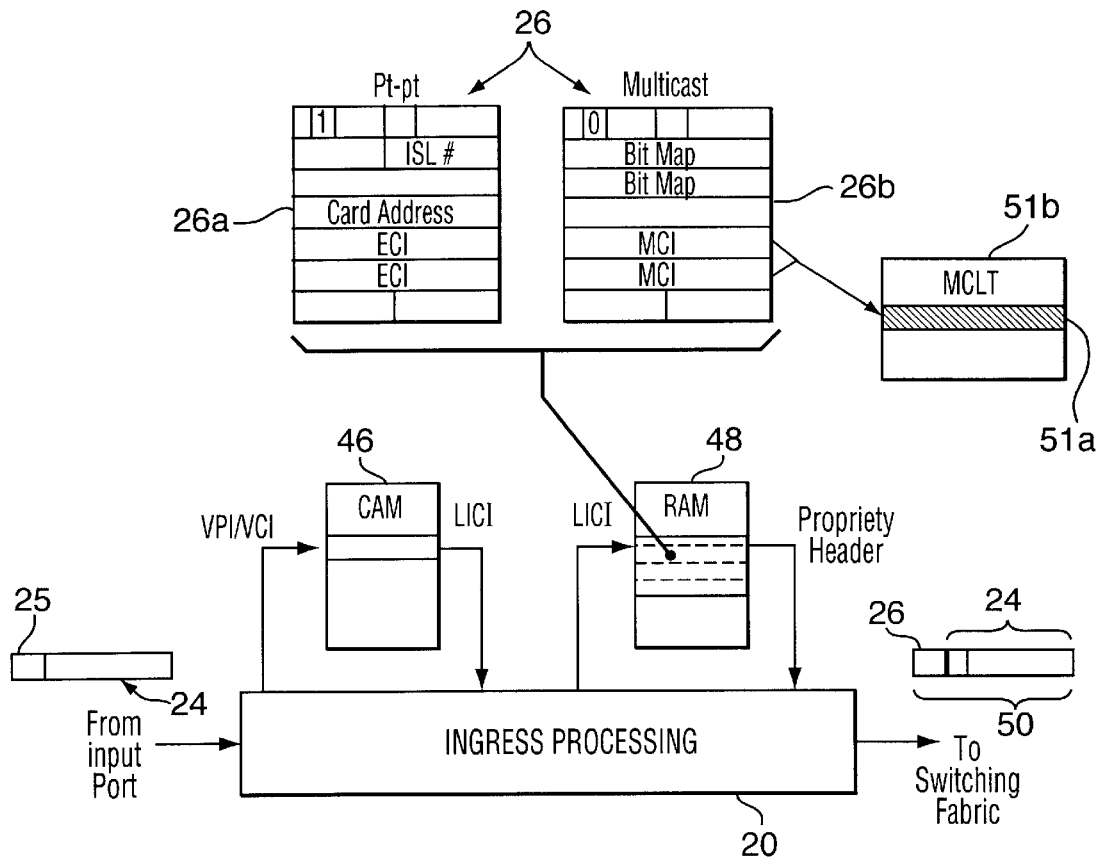
FIG. 3 is a data flow diagram illustrating how the interface cards of FIG. 2 process incoming packets (hereinafter "ingress processing")

FIG. 3 is a data flow diagram which illustrates the ingress processing in greater detail. As illustrated, the ingress processing means 20 reads VPI/VCI field 25 of ATM cell 24 and uses that value to look up a pointer in a contents addressable memory (CAM) 46 termed a local ingress connection identifer (LICI). The CAM 46 provides a means as known to those skilled in the art for compacting an address space and economizing on the amount of memory required to look up a value based on the large address space provided by the VPI/VCI fields. The LICI, in turn, points to an entry in RAM memory 48 wherein the proprietary header 26 for the specific link designated by the VPI/VCI field is stored. The ingress processing means 20 retrieves the header 26 and forms the 60 byte NATM cell 50 which is routed to the switching core 14.

In accordance with the preferred embodiment, the header 26 consists of seven (7) bytes pre-pended to the standard 53 byte ATM cell 24 in order to form the NATM cell 50 which is 60 bytes long. The information provided by the header is used to uniquely address any port 22 on any UCS housing any interface card 18, and to identify the priority of the attached ATM cell 24. The header 26 is also used to support a multi-casting capability where the address field identifies a group of UCS interface ports.

Figures 4, 5:
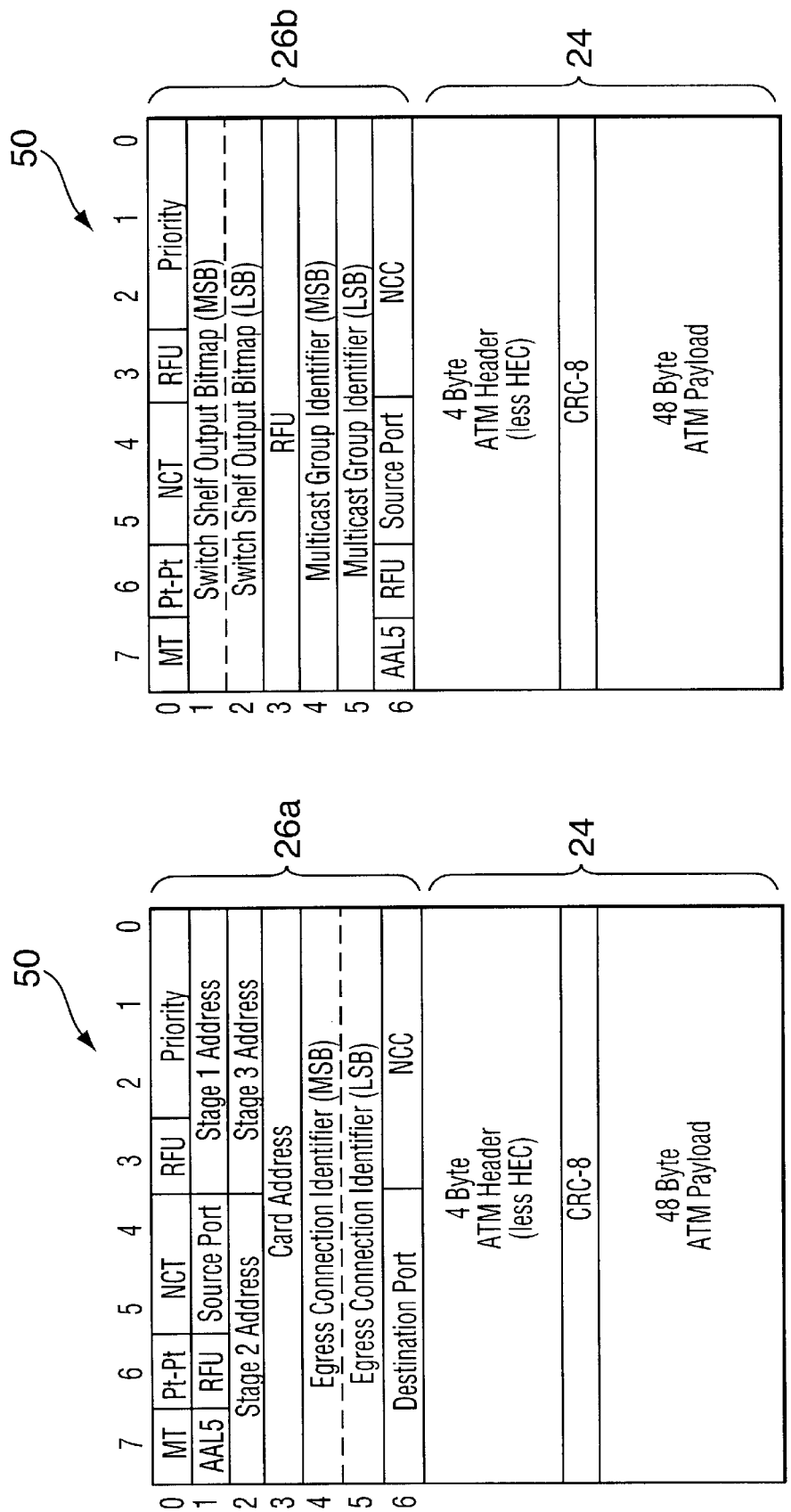
FIGS. 4 and 5 are schematic diagrams illustrating the structures of preferred headers pre-pended to incoming packets by the interface cards of FIG. 2 during the ingress processing thereof.

There are two cell types defined by the proprietary header 26: (a) point-to-point (unicast), and (b) point-to-multipoint (multicast). FIG. 4 illustrates the NATM cell 50 incorporating header 26*a* for implementing a point-to-point connection. The meaning of certain fields of header 26*a* are defined in Table A below (the other fields not defined below are more fully described in PCT Publication No. WO95/30318):

| FIELD NAME | DESCRIPTION |
|---|---|
| MT | Message type |
| RFU | Reserved for Future Use |
| Pt—Pt | Indicates addressing is either for a point-to-point or for a point-to-multipoint connection. "1" = point-to-point "0" = point-to-multipoint. |
| NCT | Newbridge Cell Type. These bits are used to determine whether the cell is part of the normal data strea. |
| AAL5 | ATM Adaptation Layer 5 |
| Source Port | Indicates cell's ingress port. Range: 1 . . . 3. Zero is illegal |
| Stage 1/ Stage 2/ Stage 3 Address | These fields each allow the selection of one output out of 16 from a switching shelf, with the capability of having 3 stages of switching shelf |
| Card Address | This field uniquely identifies a destination element within an ISL |
| Egress Connection Identifier (ECI) | This field is set on ingress by interface cards and identifies the connection at the egress point. It is used for performing address translation and statistics gathering on egress. |
| Port | Used by multi-port interface cards to address a port (from up to 16) |
| NCC | Newbridge Communications Channel. This field provides for information exchange between processing elements in a switch node. |

In the above table MSB and LSB stand for Most Significant Bit and Least Significant Bit respectively, and HEC stands for Header Error Check.

Transmitting ATM cells 24 which are part of a point-to-multipoint connection requires that the cell be routed to every drop bus 34 which has an interface card 18 that is part of the multi-cast group. The cell must also contain a multi-cast identifer that each card checks to determine if the card is part of the predetermined multi-cast group for the cell. The multi-cast identifier field is used to look up an enable bit in a multi-cast look-up table, or bitmap, (MCLT) 51*a* stored in an external memory 51*b* as described in the PCT application referenced next below. This group can then be used to determine which ports of the UCS cards are to use the cell, i.e., which interface cards 18 are to receive the data. FIG. 5 illustrates NATM cell 50 incorporating header 26*b* for implementing point-to-multipoint connection. The meaning of certain fields of header 26*b* are defined in Table B below (the other fields not defined below are more fully described in PCT Publication No. WO95/30318):

TABLE B

| FIELD NAME | DESCRIPTION |
|---|---|
| Pt—Pt | Indicates addressing is either for a point-to-point or for a point-to-multipoint connection. "1" = point-to-point; "0" = point-to-multipoint. |
| Switch Shelf Output Bitmap Source Port | A multicast cell may be routed to multiple drop busses. This is accomplished by bit mapping the output ports of the switching shelf that the cell is to take. |
| Multicast Connection Identifier (MCI) Source Port | This field is set on ingress by the interface card and identifies a system wide unique multicast group. Indicates the cell's ingress port. Range: 1 . . . 3. Zero is illegal. |

As shown in FIG. 2, the interface card 18' also includes a backplane address filtering means 60 for monitoring the multi-drop bus 34 and copying or receiving any NATM cell 50 thereon which is addressed to the card 18'. The multi-drop bus 34 operates at a relatively high speed, e.g., 800 Mb/s, and thus the card 18' may receive more NATM cells 50 then it can instantaneously deal with. In order to prevent cell loss, card 18' includes an output queueing means 62 for buffering outgoing NATM cell 50. An egress processing means 64 retrieves NATM cells 50 from the queues established by the queueing means 62 and maps the cells into the specific format of the physical interface for transmission on the output side of port 22.

Figure 6:
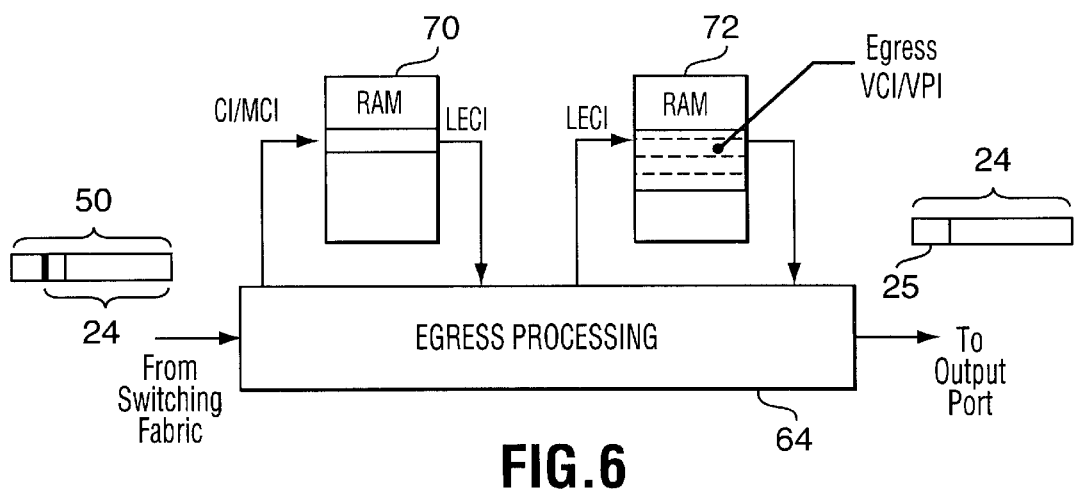
FIG. 6 is a data flow diagram illustrating how the interface cards of FIG. 2 process outgoing packets (hereinafter "egress processing")

FIG. 6 is a data flow diagram which illustrates the egress processing in greater detail. The egress processing means 64 reads the ECI (FIG. 4) or MCI field (FIG. 5) of the proprietary header 26*a* or 26*b* (as the case may be) of NATM cell 50 and uses that value to look up in a memory 70 a pointer termed a local egress connection identifier (LECI). The LECI, in turn, points to an entry in a memory 72 which stores an egress VPI/VCI value. The egress processing means 64 discards the header 26, retrieves that VPI/VCI from memory 72 and overwrites the original VPI/VCI field in the ATM cell 24 with the egress VPI/VCI value. In the foregoing manner, the preferred packet switch 10 provides a unidirectional cross-connect from an first port/VPI/VCI to a second port/VPI/VCI. For a bidirectional connection, another unidirectional cross-connect as described above is required to route packets from the second port/VPI/VCI to the first port/VPI/VCI.

In the preferred embodiment, control messages between the various cards in switch 10 are communicated using a virtual control channel as explained more fully in PCT Publication No. WO95/30318. A variety of message protocols can be employed to implement control messaging.

The above description has made reference to two different types of perpended headers used in the 36170 system, namely point-to-point or unicast header 26a and point-to-multipoint or multicast header 26b. In alternative embodiments, a single type of header having a bitmapped address field may be used, where setting a single bit in the bitmap constitutes or references a unicast or point-to-point connection, and the setting of multiple bits in the bitmap constitutes or references a multicast or point-to-multipoint connection.

DESTINATION ADDRESS MODIFICATION

Typically, a multicast connection cell header, such as header 26b, contains the destination for an ATM cell. Referring to FIG. 12, this often comes in the form of a bitmap 51a pointed to by the MCI field as described previously. For example, if an NXN switch, such as switch 10, has 16 possible output destinations then the MCI field in a multicast cell header 26b may point to a 16 bit bitmap 51a indicating the destinations of the multicast cell.

16 bits are used in this example as the 36170 has up to 16 ISL's. Of course, this is purely a design limitation and alternate configurations are possible as would be evident to one skilled in the art.

By referencing this bitmap 51a, the NXN switch 10 can inherently filter off the cell at different switch output queuing points 40a, 40b (FIG. 10) according to the destination addresses in the bitmap 51a, thus achieving the cell copying task (i.e. multicasting). In this example, the cells are filtered at various filtering means in a queue manager, not shown, in the switch core 14. Each destination to a different output queuing point of a multicast cell may be referred to as a leaf.

If at the time of transmission, the backpressure state of one or more of the destination switch output queues 40a is ON and the cell is a UBR cell then the destination bitmap 51a for the cell is modified by the system 30f so that this particular cell is no longer destined to a leaf congested at switch core 14. The backpressure state of an output queue 40a can be determined by checking the state (in the queue backpressure bitmap maintained by the system 30f of FIG. 2, as described previously) of the corresponding unicast input queue of queues 30g, 30h which will have been set by the last received backpressure message from the switch core 14 for that unicast input queue. This effectively discards the multicast cell on a best-effort basis in accordance with the congestion level of the switch core 14 output queue 40a.

UBR service has been chosen for the application of destination address modification in the preferred embodiment because UBR is a best effort quality of service and it can tolerate the cell loss for the congested leaf ABR requires a more rigid cell loss commitment. Accordingly, destination address modification was not applied to ABR in the preferred embodiment; however, destination address modification could be applied to such service as ABR is a non real-time service. Similarly, destination address modification could also be applied to nrt-VBR provided that service is made to respond to backpressure.

Multicast UBR cells can be separately queued onto a single queue 30j at the, input queuing point of the hub card 30 as shown in FIG. 2. At the head of this queue 30j, when it is time for transmission of the cell from the bitmap 51a is modified for the outgoing cell by the system 30f as described above so that the cell is transmitted on a best-effort basis while maintaining the integrity of the backpressure indication.

For example, if a multicast connection is destined to output ports 1, 4, 7 then the bitmap 51a may take the form shown in FIG. 12. If output port 7 is congested and exerting backpressure then the bitmap 51a is modified to send to only destinations 1 and 4 as shown in FIG. 13.

Referring to FIG. 16, the destination address modification can be performed generically using a destination address modification unit 30n which modifies the bitmap 51a of a cell before it is transmitted from the queue 30j. The unit 30n contains a portion of the system 30f described above, as required to perform destination address modification.

DESTINATION ADDRESS MODIFICATION WITH PRIMARY ROUTE IDENTIFICATION

Destination address modification can be altered by having the network management system for the ATM network declare the most important destination ("primary route") for a multicast connection. Instead of queuing UBR multicast connections separately at the input queuing point in queue 30j, the multicast connection is queued on the unicast input port 30h corresponding to the output-port queue identified as the primary route.

For example, if a multicast connection is destined to output ports 1, 4 and 7, and port 4 is declared as the primary route, then this multicast connection is queued at output-port queue 4 of queues 30h at the input queuing point. Since output port queue 4 is for a unicast connection destined for output port 4, it will react to backpressure indication coming from switch output port queue 4 and guarantee cell losslessness through the fabric. As such, if this multicast connection queues on output queue 4 at the input queuing point then its delivery to the leaf on output queue 4 is guaranteed, hence the term "primary route" which indicates its primary importance.

The destination address modification is performed for all leafs, other than the "primary route" output queue.

Referring to FIG. 17, the multicast queue 30j is no longer used, and is deleted. Incoming multicast cells 30p are queued in the queue of queues 30h as indicated by a primary route field, not shown, in the cells 30p header, and read by the queue manager 30c. The user must select the primary route at the time of call setup.

Alternatively, the queue manager 30c uses the connection identifier MCI field on the cell 30p to determine the primary route from information stored in bitmap 51a (again selected at call setup), for placement of the cell 30p in the appropriate queue of queues 30h.

When using primary route identification, the destination address modification unit 30n has access to each of the queues 30h as those queues may each have multicast cells which may require modification to the non-primary route leafs (as discussed previously), with or without optional PPD as discussed below.

PARTIAL PACKET DISCARD

To improve performance, one can introduce to destination address modification the concept of partial packet discard (PPD).

Referring to FIG. 14, ATM is a generic transport mechanism which uses unique 53 byte cells. One common form of usage is to deploy applications (especially data and non real-time traffic) over AAL5 packets which are then segmented into ATM cells. If a cell carrying data forming part of an AAL5 packet is discarded (not transmitted) for whatever reason then the whole packet is deemed incomplete and useless and has to be retransmitted. It is therefore pointless to keep on transmitting the rest of the AAL5 packet as network bandwidth is simply wasted.

PPD intentionally discards (does not transmit) the "partial" packet (remaining cells) after the original discarded cell so as to conserve bandwidth. PPD is applied on a per leaf basis after destination address modification has occurred.

To continue with the example used previously, if the cell contains an AAL5 partial packet (as indicated by a bit in header 26*b* per FIG. 5) and the cell is a multicast cell with destination to 1, 4, 7 per bitmap 51*a* of FIG. 12 is modified to 1, 4 (when 7 is in backpressure) per FIG. 13 then the arbiter and congestion management system 30*f* will continue to modify the bitmap 51*a* not to send to leaf 7 even if backpressure is turned off for leaf 7. The system 30*f* will examine the incoming cells at the queue 30*h* containing AAL5 partial packets. When the AAL5 partial packet contains an end of packet (EOM) indication, destination address modification ceases and that cell is preserved. This prevents the next packet from appearing to be a corrupted packet.

Referring to FIGS. 16, 17 and 18, PPD is performed in these configurations by the unit 30*n* before the cell is transmitted from the queue 30*j* or 30*h*, as appropriate.

HYBRID HEAD OF LINE BLOCKING

Destination address modification is in general a best effort mechanism for transporting multicast connection in a backpressure switching architecture. To significantly improve performance (i.e. lessen the probability of discarding cells), destination address modification may be used selectively according to the occupancy of the input queue 30*j*.

Again, UBR multicast connections are queued into a single queue 30*j*, at the input queuing point per FIG. 2. Referring to FIG. 15, the queue 30*j* is divided into two regions via threshold T. The region lower than T is called the "assured" region. When queue occupancy (size) is lower than T, the cells in the queue have "assured" delivery and no destination address modification occurs. The queue 30*j* is basically operated in a head-of-line ("HOL") blocking mode. The multicast cells are sent only when the backpressure system permits.

When the queue 30*j*, starts to grow past threshold T, it is in a "non-assured" region and the system 30*f* performs destination address modification on cells from queue 30*j*, with or without optional PPD, and starts sending the multicast cells on a best-effort ("non-assured") basis. This inhibits the discard actions of destination address modification; thereby improving cell loss performance while maintaining a reasonably low HOL blocking probability.

Referring to FIG. 18, the application of hybrid head of line blocking can be generically indicated by a threshold T on queue 30*j*, which indicates whether or not it has been exceeded to unit 30*m*. Unit 30*m* in turn uses this information to determine whether or not to send cells from queue 30*j*, as described above. Primary route identification is not used with this hybrid head of line blocking technique, thus unit 30*n* only destination address modifies cells from multicast queue 30*j*. PPD may also be utilized.

Those skilled in the art will appreciate that the invention is not limited by what has been particularly shown and described herein as numerous modifications and variations may be made to the preferred embodiment without departing from the spirit and scope of the invention. For example, the above description is primarily directed to applications of the principles described to UBR traffic; however, they are equally applicable to all non real-time traffic, including ABR and nrt-VBR.

The embodiments of the invention in which an exclusive property or privilege is claimed are defined as follows:

1. A method of relieving congestion in a packet switch, the method comprising the steps of:
    sending cells to output ports of a switch core in accordance with a destination address specified for each cell;
    monitoring for congestion at each output port;
    when congestion is detected at an output port and cells are received at an input port of the switch destined for multiple destination addresses including the congested output port, modifying the multiple destination addresses to remove the destination address of the congested output port; and
    continuing to send the modified cell to the multiple destination addresses other than the congested output port.

2. The method of claim 1, further comprising the step of:
    prior to receiving cells at input ports of the switch that are destined for multiple destination addresses, identifying a primary route at the option of a user for such cells and if the congested output port is on the primary route then not modifying the multiple destination addresses for the cells to remove the destination address of the congested output port.

3. The method of claim 1, further comprising the step of:
    for all cells:
        (i) received at the input port;
        (ii) destined for multiple destination addresses including the congested output port; and
        (iii) forming part of a multiple cell packet where one of the multiple destination addresses of one of the cells in the packet has been modified to remove the destination address of the congested port;
    discarding those remaining cells in the packet received at the input port and destined for the congested output port whether or not the congested output port continues to be congested, until receiving the cell containing an end of packet boundary.

4. The method of claim 1, wherein the step of:
    modifying the multiple destination addresses is not performed if less than a given number of cells have been queued at the input port and not already sent from the input port to the switch core.

5. The method of claim 2, further comprising the step of:
    for all cells:
        (i) received at the input port;
        (ii) destined for multiple destination addresses including the congested output port; and
        (iii) forming part of a multiple cell packet where one of the multiple destination addresses of one of the cells in the packet has been modified to remove the destination address of the congested port;
    discarding those remaining cells in the packet received at the input port and destined for the congested output port whether or not the congested output port continues to be congested, until receiving the cell containing an end of packet boundary.

6. The method of claim 5, wherein the step of:
    modifying the multiple destination addresses is not performed if less than a given number of cells have been queued at the input port and not already sent form the input port to the switch core.

7. An apparatus for relieving congestion in a packet switch, the apparatus comprising:
    means for sending cells to output ports of a switch core in accordance with a destination address specified for each cell;

means for monitoring for congestion at each output port;

means for, when congestion is detected at an output port and cells are received at an input port of the switch destined for multiple destination addresses including the congested output port, modifying the multiple destination addresses to remove the destination address of the congested output port; and means for continuing to send the modified cell to the multiple destination addresses other than the congested output port.

8. The apparatus of claim 7, further comprising:

means for, prior to receiving cells at input ports of the switch that are destined for multiple destination addresses, identifying a primary route at the option of a user for such cells and if the congested output port is on the primary route then not modifying the multiple destination addresses for the cells to remove the destination address of the congested output port.

9. The apparatus of claim 7, further comprising:

means for, for all cells:
  (i) received at the input port;
  (ii) destined for multiple destination addresses including the congested output port; and
  (iii) forming part of a multiple cell packet where one of the multiple destination addresses of one of the cells in the packet has been modified to remove the destination address of the congested port;

discarding those remaining cells in the packet received at the input port and destined for the congested output port whether or not the congested output port continues to be congested, until receiving the cell containing an end of packet boundary.

10. The apparatus of claim 7, wherein:

the means for modifying the multiple destination addresses does not perform such modification if less than a given number of cells have been queued at the input port and not already sent from the input port to the switch core.

11. The apparatus of claim 8, further comprising:

means for, for all cells:
  (i) received at the input port;
  (ii) destined for multiple destination addresses including the congested output port; and
  (iii) forming part of a multiple cell packet where one of the multiple destination addresses of one of the cells in the packet has been modified to remove the destination address of the congested port;

discarding those remaining cells in the packet received at the input port and destined for the congested output port whether or not the congested output port continues to be congested, until receiving the cell containing an end of packet boundary.

12. The apparatus of claim 11, wherein:

the means for modifying the multiple destination addresses does not perform such modification if less than a given number of cells have been queued at the input port and not already sent form the input port to the switch core.

\* \* \* \* \*